United States Patent
Bauman

(10) Patent No.: US 9,612,333 B2
(45) Date of Patent: Apr. 4, 2017

(54) SYSTEM FOR SHARING ATMOSPHERIC DATA

(71) Applicant: Erik Jason Bauman, Springfield, IL (US)

(72) Inventor: Erik Jason Bauman, Springfield, IL (US)

( * ) Notice: Subject to any disclaimer, the term of this patent is extended or adjusted under 35 U.S.C. 154(b) by 777 days.

(21) Appl. No.: 14/045,907

(22) Filed: Oct. 4, 2013

(65) Prior Publication Data

US 2015/0097723 A1   Apr. 9, 2015

(51) Int. Cl.
| | |
|---|---|
| G01S 19/13 | (2010.01) |
| G01S 19/15 | (2010.01) |
| G01S 3/02 | (2006.01) |
| G01S 17/95 | (2006.01) |
| G08G 5/00 | (2006.01) |

(52) U.S. Cl.
CPC ............. *G01S 17/95* (2013.01); *G08G 5/0008* (2013.01); *G08G 5/0091* (2013.01)

(58) Field of Classification Search
USPC ...... 342/357.2, 357.35, 357.51, 357.53, 456, 342/462; 701/301, 468, 497
See application file for complete search history.

(56) References Cited

U.S. PATENT DOCUMENTS

| | | |
|---|---|---|
| 3,599,488 A | 8/1971 | Mather et al. |
| 3,856,402 A | 12/1974 | Low et al. |
| 4,195,931 A | 4/1980 | Hara |
| 4,589,070 A | 5/1986 | Kyrazis |
| 4,591,113 A | 5/1986 | Mabey |
| 6,507,776 B1 | 1/2003 | Fox, III |
| 6,531,967 B2 | 3/2003 | Djorup |
| 6,828,923 B2 | 12/2004 | Anderson |
| 7,411,519 B1 | 8/2008 | Kuntman et al. |

*Primary Examiner* — Dao Phan

(74) *Attorney, Agent, or Firm* — Hauptman Ham, LLP

(57) ABSTRACT

A system for sharing data between aircraft including a GPS unit for establishing a first aircraft's location and altitude from a network of global satellites and an automatic dependent surveillance broadcast (ADS-B) unit broadcasting a first aircraft's identification as well as it's location and altitude. The system also includes a mechanism for measuring the wind speed and turbulence at the location of the first aircraft and for broadcasting that information to other aircraft in the area. A second aircraft as well as other aircraft also include an ADS-B receiver for receiving such information.

1 Claim, 2 Drawing Sheets

SYSTEM FOR SHARING ATMOSPHERIC DATA

FIELD OF THE INVENTION

This invention relates to a system for sharing atmospheric data between aircraft and more particularly to a system for sharing a first aircraft's location and altitude together with wind speed and turbulence at the first aircraft's location with other aircraft.

BACKGROUND FOR THE INVENTION

According to the Federal Aviation Administration's Surveillance and Broadcast Service (FAA) their Surveillance and Broadcast Services Program was formed in 2005. That Program is charged with changing the nations air traffic control system from one that relies on radar technology to a system that uses precise location data from the global satellite network.

Enabling this evolution is a proven technology called Automatic Dependent Surfeillance-Broadcast (ADS-B). ADS-B is a crucial component of the nation's Next Generation Air Transportation System, and its implementation over the next 20 years will turn the next generation vision into a reality. After years of research and development, and use by general aviation pilots in Alaska and air transport carriers in the Ohio River Valley, the FAA determined in 2005 that ADS-B is ready to be made operational throughout the national airspace system.

With ADS-B, both pilots and controllers will see radar-like displays with highly accurate traffic data from satellites—displays that are updated in real time and don't degrade with distance or terrain. The system will also give pilots access to weather services, terrain maps and flight information services. The improved situational awareness will mean that pilots will be able to fly at safe distances from one another with less assistance from air traffic controllers.

The gains in safety, capacity and efficiency as a result of moving to a satellite-based system will enable the FAA to meet a tremendous growth in air traffic predicted in coming decades. Because ADS-B is a flexible and expandable platform, it can change and grow with the evolving aviation system.

Currently in Aircraft Broadcast there are four digit assigned transponder codes and pressure altitude whenever they are pinged by ground-based radar from air traffic control. In many busier air spaces the information on position and altitude as well as whether the airplane is level, climbing or descending, is broadcast from the ground so that it can be viewed inside aircraft with the appropriate equipment available on most medium and larger aircraft. It is presently believed that some planes can also interpret the Mode S transponder signals from other aircraft so that they can display traffic information even when not receiving the information broadcast from the ground. With respect to wind information there are currently subscription services that will send forecast winds to the plane. A pilot can thus scroll through these and get a graphical representation of the forecast winds at square grid points at 3,000-feet intervals. It is also a fact that many aircraft are presently equipped with Mode S transponders.

The FAA has mandated that all aircraft at some point in the future comply with ADS-B. This protocol involves broadcasting position information from the plane's GPS. Presumably any plane able to send this information out would also be able to interpret this information coming in from other planes. This will mean that air traffic control and other planes will not need the ground-based radar to know the position of aircraft in their vicinity.

Most larger aircraft "know" what their winds are. Looking at a certain page on the GPS or flight management system (FMS) will show that the winds might be out of the west at 50 knots, represented as "270/50."

A turbulence instrument can also provide two numbers as measures of frequency and intensity of vibrations. The accelerometer could consist of a damped weight attached to a spring and a measuring device. The unit could send out a signal saying that it was experiencing 45 vibrations/minute at an intensity of "3", which might correspond to 1.4 times the force of gravity.

This information could be appended to an ADS-B transmission. The ADS-B signal would likely consist of tagged information in a certain order that would end with something like <end of data> or an equivalent tag. It could be followed by a <comments> or a supplemental section that, after sending the required position and altitude information, could send "winds:270/50, turb:45/3."

Alternatively, this information could be sent to ground or satellite receivers and relayed to other aircraft capable of receiving those signals.

Once this data has been received in an aircraft, a more basic display could simply append the wind and turbulence data onto the traffic altitude reading. For example, most traffic displays would show another aircraft, 7,000 ft higher as a little diamond with "+70" written above it. If that plane were in smooth air that was blowing from the northwest at 30 knots the display might read "+70 315/30 00-0.

More complex instrumentation could combine actual wind information (or forecast wind information) with known aircraft performance data to predict what the ground speed and fuel burn would be at different altitudes. This could be accessed through different pages in the flight management system or it could be sent to alert the pilots when a clearly superior altitude option is available.

Under the proposed system the crew of one aircraft can look at the screen which previously provided only a graphical representation of traffic but now in addition to the usual altitude information next to each aircraft symbol there is also information on that plane's winds and the condition of its ride. The pilot in another plane is thus alerted by a message on one of his cockpit screens that a particular altitude would give him a better speed and cause the flight to burn less fuel. A pilot in a third plane checks a particular information screen and sees that going up 2,000 feet would save him fuel over all but might lengthen the time of the flight while going down 4,000 feet would get him to his destination minutes faster but cause him to burn more or less fuel.

BRIEF SUMMARY OF THE INVENTION

A system for sharing atmospheric data between aircraft comprises or consists of means, including a GPS unit for establishing a first aircraft's location and altitude form a network of global positioning satellites. The system also includes an automatic dependent surveillance broadcast (ADS-B) unit for generating and broadcasting a signal indicative of the first aircraft's location and altitude. Further, the system provides means for measuring the wind speed at the location and altitude of the first aircraft as well as the air turbulence at that location and altitude. In addition, means for adding airspeed and air turbulence experienced by the first aircraft at its location and altitude to the signal broadcast by the automatic dependent surveillance unit in the first aircraft and finally the system includes means for receiving and displaying the signal broadcast from the first aircraft in a second aircraft.

The invention will now be described in connection with the accompanying drawings wherein like reference numerals have been used to define like parts.

DESCRIPTION OF THE PREFERRED EMBODIMENTS OF THE INVENTION

Figure 1:
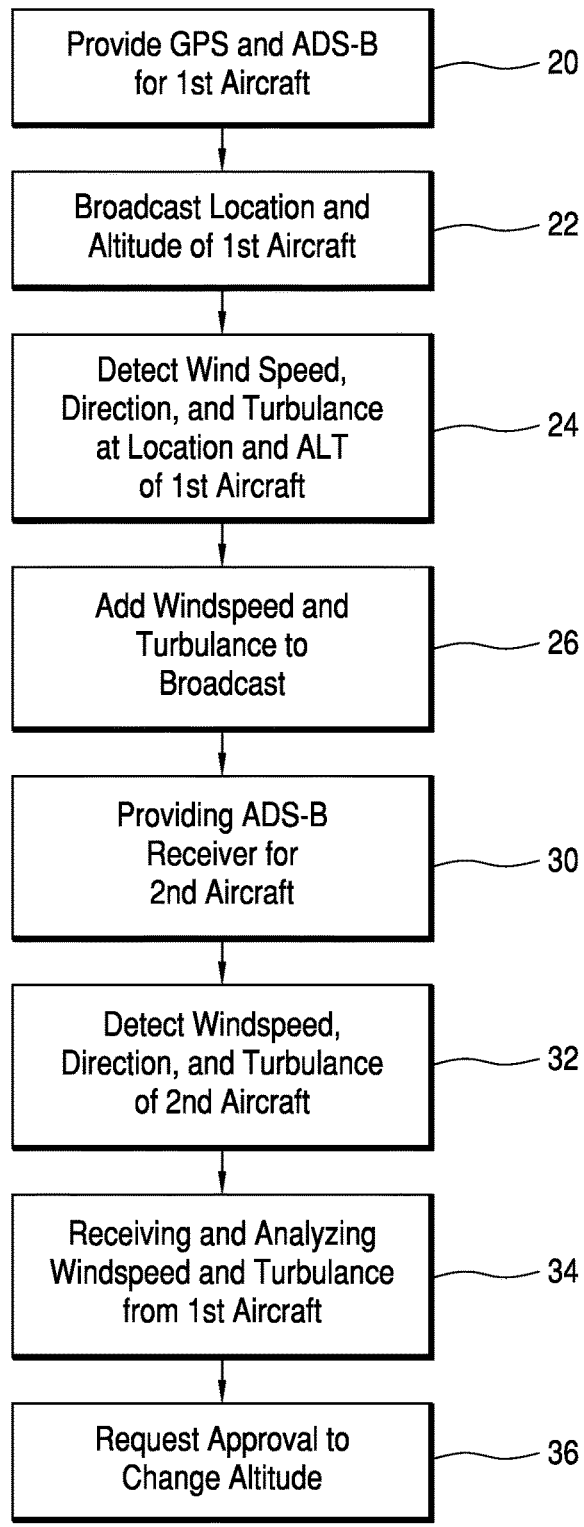
FIG. 1 is block diagram illustrating a method in accordance with a first embodiment of the invention.
Figure 2:
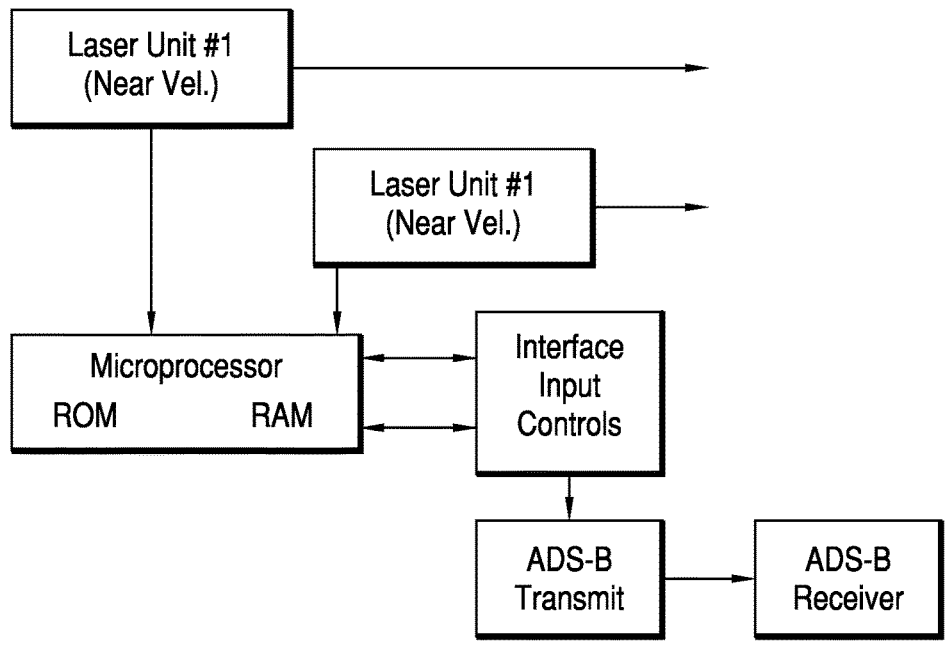
FIG. 2 is a block diagram illustrating a method for measuring wind speed and direction at a given location and altitude and for broadcasting such information for use by other aircraft.

As illustrated in FIG. 1 a method for sharing atmospheric data between aircraft includes the following steps. In a first step 20 a global positioning satellite (GPS) system is provided together with an automatic dependent surveillance—broadcast (ADS-B) unit for detecting the location and altitude of a first aircraft and for automatically broadcasting or transmitting the location and altitude of the first aircraft in step 22.

The method in accordance with the first embodiment of the invention also includes a step 24 of calculating wind speed and direction by conventional means while turbulence and intensity are measured by an accelerometer such as a damped weight attached to a spring and a measuring device for measuring vibration per minute and intensity. In step 26, the wind speed direction and intensity is added to the location and altitude of the first aircraft and transmitted or broadcast by the first aircraft.

In step 28 a second global positioning satellite (GPS) system and a second automatic dependent surveillance broadcast (ADS-B) unit is provided in a second aircraft for sensing and/or detecting the location and altitude of the second aircraft and for receiving information transmitted by the first aircraft in step 32 as well as from other aircraft in the area. Such information is fed to the aircraft's flight management system and in step 34 analyzed to determine whether or not more favorable winds and less turbulence would be available at a different altitude.

Then, if more favorable winds that would reduce fuel consumption and/or less turbulence that would result in smoother flight conditions would be available, the pilot in step 36 could ask air traffic control for permission to proceed to that altitude in a single radio broadcast.

It is presently believed that in addition to the above additional useful information useful to other pilots can be transmitted from an aircraft about conditions being experienced by that aircraft as well as the location and altitude of the aircraft. For example, many aircraft are equipped with wind velocity measuring equipment which measures wind velocity and direction of the aircraft and at some distance as for example ½ mile from the aircraft. One example of such equipment is described in a Kyrazis U.S. Pat. No. 4,589,070 which is incorporated herein in its entirety by reference.

Figure 3:
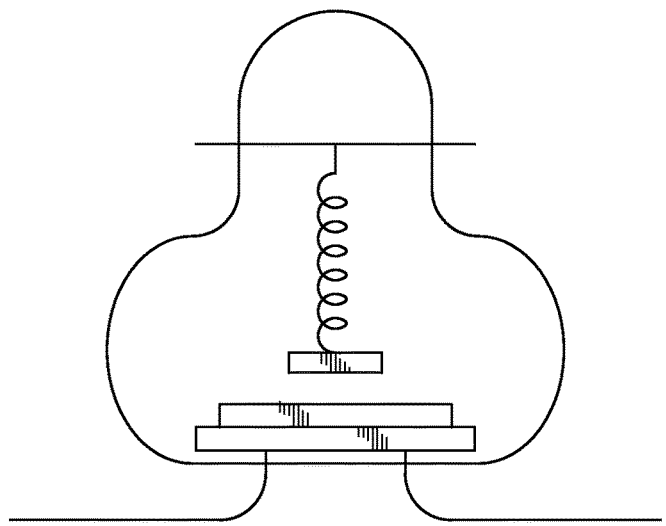
FIG. 3 is schematic illustration of a system for measuring turbulence in accordance with the present invention.

Air turbulence may be measured by a number of techniques. For example, one approach to an apparatus for measuring air turbulence encountered by an aircraft is disclosed in a Mather et al., U.S. Pat. No. 3,599,488. As disclosed therein, air turbulence encountered by an aircraft is measured according to the following equation;

$$I_a \frac{P_{T\partial} P_T}{(P_T - K \cdot P_S)^2}$$

wherein I is a measure of the intensity of the longitudinal component of the turbulence. P, is the static air pressure, $P_T$ is the total air pressure, $\delta P_T$ is the fluctuation of the total air pressure, and K is a function of the slope of a linear approximation to a graph of actual values for $$\frac{P_s}{P_T} \text{ versus } \frac{V}{\sqrt{T_T}}$$

where V fis the average true airspeed and $T_T$ is the total absolute temperature. The details of such apparatus are disclosed in the aforementioned patent that is incorporated herein in its entirety by reference. It is also contemplated that the air turbulence can be measured by a simple spring device as shown in FIG. 3 wherein a weight 40 is suspended by a spring 42 in a small cavity 44 with a pressure plate 46 disposed on the bottom of the cavity 44.

The pressure plate 46 generates a signal each time that it is struck by the weight. The flight management system or other cockpit instrument receives the signals and presents it in a manner understood by a pilot. For example, it might present the number of strikes during a thirty (30) second interval that is the frequency plus the maximum force of a strike as a measure of intensity. This information would then be transmitted over the ADS-B unit. A pilot in a second aircraft would receive a signal indicating the location and altitude of the first aircraft together with the wind speed and direction as well as the turbulence and intensity being experienced by an aircraft at that location.

As an example a pilot of a second aircraft would look at a blip of a particular aircraft on his flight management system or air data computer or other traffic display and see that all the planes at one altitude had a turbulence number between 3 and 12 at another altitude between 15 and 30 and someone flying through a storm might have a number closer to fifty. With a more sophisticated implementation the device would measure the number of times the weight struck the pressure plate and the maximum force of the weight on the pressure plate during a 30 second interval. Coordinating equipment would then assign an intensity number based on the maximum force felt in the past 30 seconds. At one altitude the turbulence and intensity might be light while at another altitude an aircraft might indicate severe turbulence with high intensity. When appropriate, a pilot could radio air traffic control for permission to proceed at a different altitude. At the same time, there would be less radio traffic for consideration by an air traffic controller.

While the invention has been disclosed in connection with its preferred embodiments it should be recognized that changes and modifications may be made therein without departing from the scope of the claims.

What is claimed is:

1. A method for sharing atmospheric data between aircraft, said method comprising the steps of:
providing a GPS unit for establishing a first aircraft's location and altitude from a network of global positioning satellites;

providing an automatic dependent surveillance broadcast (ADS-B) unit for generating and broadcasting a signal indicative of the first aircraft's location and altitude;

calculating the wind speed at the location and altitude of the first aircraft;

measuring the air turbulence at the location and altitude of the second aircraft;

adding the wind speed and air turbulence experienced by the first aircraft at its location and altitude to said signal broad cast by said automatic dependent surveillance unit in the said first aircraft; and receiving and displaying the broadcast from the first aircraft in a second aircraft.

\* \* \* \* \*